(12) United States Patent
Zeng et al.

(10) Patent No.: US 11,967,856 B2
(45) Date of Patent: Apr. 23, 2024

(54) METHOD AND APPARATUS FOR DISTRIBUTING ELECTRIC ENERGY QUANTITY

(71) Applicant: Gree Electric Appliances, Inc. of Zhuhai, Guangdong (CN)

(72) Inventors: Haitao Zeng, Guangdong (CN); Xianjun He, Guangdong (CN); Jin Shen, Guangdong (CN); Wenjun Pang, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 553 days.

(21) Appl. No.: 17/281,178

(22) PCT Filed: Aug. 13, 2019

(86) PCT No.: PCT/CN2019/100403
§ 371 (c)(1),
(2) Date: Mar. 29, 2021

(87) PCT Pub. No.: WO2020/078085
PCT Pub. Date: Apr. 23, 2020

(65) Prior Publication Data
US 2021/0399572 A1 Dec. 23, 2021

(30) Foreign Application Priority Data
Oct. 19, 2018 (CN) .......................... 201811222883.5

(51) Int. Cl.
*H02J 7/35* (2006.01)
*G06Q 50/06* (2012.01)
*H02J 3/38* (2006.01)

(52) U.S. Cl.
CPC ................ *H02J 7/35* (2013.01); *G06Q 50/06* (2013.01); *H02J 3/381* (2013.01); *H02J 2300/24* (2020.01)

(58) Field of Classification Search
USPC .............................. 320/102, 104, 106, 108
See application file for complete search history.

(56) References Cited

U.S. PATENT DOCUMENTS

| 2007/0203860 A1* | 8/2007 | Golden ................. G06Q 50/06 705/412 |
| 2018/0041072 A1* | 2/2018 | Clifton ...................... H02J 3/32 |
| 2018/0278080 A1 | 9/2018 | Matoba |

FOREIGN PATENT DOCUMENTS

| CN | 102237681 A | * 11/2011 |
| CN | 102237681 A | 11/2011 |

(Continued)

OTHER PUBLICATIONS

International Search Report, dated Oct. 28, 2019, in International application No. PCT/CN2019/100403, filed on Aug. 13, 2019.

*Primary Examiner* — Brian Ngo
(74) *Attorney, Agent, or Firm* — McAndrews, Held & Malloy, Ltd.

(57) ABSTRACT

The present disclosure provides a method and apparatus for distributing an electric energy quantity. The method and apparatus are used for solving a problem that electric energy cannot be reasonably distributed among multiple household appliances in the related art. The method includes that a terminal detects a first remaining electric energy quantity of a photovoltaic panel; the terminal determines, according to pre-determined identification information of at least one household appliance to be electrified corresponding to each remaining electric energy quantity range of the photovoltaic panel, first identification information corresponding to a first remaining electric energy quantity range where the first (Continued)

remaining electric energy quantity is located; and the terminal controls the photovoltaic panel to electrify a first household appliance of the first identification information.

18 Claims, 3 Drawing Sheets

(56) References Cited

FOREIGN PATENT DOCUMENTS

| CN | 103248089 | A |   | 8/2013  |            |
|----|-----------|---|---|---------|------------|
| CN | 105264739 | A |   | 1/2016  |            |
| CN | 205123290 | U |   | 3/2016  |            |
| CN | 105700365 | A |   | 6/2016  |            |
| CN | 106559297 | A |   | 4/2017  |            |
| CN | 206671878 | U | * | 11/2017 |            |
| CN | 107707603 | A |   | 2/2018  |            |
| CN | 107800131 | A | * | 3/2018  | G01R 11/56 |
| CN | 109409727 | A |   | 3/2019  |            |

\* cited by examiner

METHOD AND APPARATUS FOR DISTRIBUTING ELECTRIC ENERGY QUANTITY

CROSS-REFERENCE TO RELATED APPLICATIONS

The present disclosure is a 371 of International Patent Application No. PCT/CN20019/100403, filed Aug. 13, 2019, and claims the priority for Chinese Patent Application No. 201811222883.5, applied on Oct. 19, 2018 and entitled "Method and Apparatus for Distributing Electric Energy Quantity", both of which are incorporated in their entireties herein as reference.

TECHNICAL FIELD

The present disclosure relates to the technical field of terminals, and in particular to a method and apparatus for distributing an electric energy quantity.

BACKGROUND

With depletion of global energy sources, people have paid wide attention and emphasis upon the application and development of new energy industries such as solar power generation. At present, the technology of converting solar energy into electric energy by a photovoltaic panel device is relatively mature, which can realize high-efficiency energy conversion.

With continuous increase in kinds of household appliances, household power consumption is continuously increasing. In related art, an electric energy quantity stored by a photovoltaic panel is limited. When one photovoltaic panel electrifies multiple household appliances, how to reasonably distribute electric energy among the multiple household appliances is a technical problem which has not been solved yet.

SUMMARY

At least some embodiments of the present disclosure disclose a method and apparatus for distributing an electric energy quantity, so as at least to partially solve a problem that electric energy cannot be reasonably distributed among multiple household appliances in the related art.

In an embodiment of the present disclosure, a method for distributing the electric energy quantity is provided. The method includes:

detecting, by a terminal, a first remaining electric energy quantity of a photovoltaic panel;

determining, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and controlling the photovoltaic panel to electrify a first household appliance of the first identification information.

In one embodiment, a process of pre-determining the identification information of the at least one household appliance to be electrified corresponding to each remaining electric energy quantity range of the photovoltaic panel includes:

for each remaining electric energy quantity range, according to pre-stored target priority corresponding to the remaining electric energy quantity range and pre-stored priority corresponding to each household appliance of different identification information, searching for a target household appliance with the target priority, and determining identification information of the searched target household appliance as identification information of a household appliance to be electrified corresponding to the remaining electric energy quantity range of the photovoltaic panel.

In one embodiment, a process of pre-storing the priority corresponding to the identification information of the household appliance includes:

when an instruction for setting priority for each household appliance is received, starting Augmented Reality (AR) to acquire, through scanning, a first appearance image of the household appliance;

identifying a first target appearance image matching the first appearance image in pre-stored appearance images of all the household appliances;

determining, according to first identification information corresponding to the first target appearance image, whether priority corresponding to the first target appearance image of the first identification information is stored; and when the priority corresponding to the first target appearance image of the first identification information is not stored, displaying a priority setting interface, receiving, in the priority setting interface, priority set by a user for the first target appearance image of the first identification information, and storing the priority.

In one embodiment, a process of pre-storing the priority corresponding to identification information of each household appliance includes:

when the instruction for setting the priority for each household appliance is received, displaying an input interface of the identification information of each household appliance and receiving second identification information of each household appliance input by a user;

determining whether priority corresponding to the second identification information is stored; and when the priority corresponding to the second identification information is not stored, displaying a priority setting interface, receiving, in the priority setting interface, priority set by a user for each household appliance of the second identification information, and storing the priority.

In one embodiment, the priority setting interface displays acquired power consumption information of a household appliance with priority to be set.

In one embodiment, a process of acquiring the power consumption information of the household appliance with the priority to be set includes:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

Another embodiment of the present disclosure provides the apparatus for distributing the electric energy quantity. The apparatus includes:

a detection module, configured to detect a first remaining electric energy quantity of a photovoltaic panel;

a determination module, configured to determine, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and an electrification module, configured to control the photovoltaic panel to electrify a first household appliance of the first identification information.

In one embodiment, the determination module is configured to, for each remaining electric energy quantity range, according to pre-stored target priority corresponding to the remaining electric energy quantity range and pre-stored priority corresponding to each household appliance of different identification information, search for a target household appliance with target priority, and determine identification information of the searched target household appliance as identification information of a household appliance to be electrified corresponding to the remaining electric energy quantity range of the photovoltaic panel.

In one embodiment, the determination module is configured to, when an instruction for setting the priority for each household appliance is received, start AR to acquire, through scanning, a first appearance image of the household appliance;

identify a first target appearance image matching the first appearance image in pre-stored appearance images of all the household appliances;

determine, according to first identification information corresponding to the first target appearance image, whether priority corresponding to the first target appearance image of the first identification information is stored; and when the priority corresponding to the first target appearance image of the first identification information is not stored, display a priority setting interface, receive, in the priority setting interface, priority set by a user for the first target appearance image of the first identification information, and store the priority.

In one embodiment, the determination module is further configured to, when the instruction for setting the priority for each household appliance is received, display an input interface of the identification information of each household appliance and receive second identification information of each household appliance input by the user;

determine whether priority corresponding to the second identification information is stored; and when the priority corresponding to the second identification information is not stored, display a priority setting interface, receive, in the priority setting interface, priority set by the user for each household appliance of the second identification information, and store the priority.

In one embodiment, the priority setting interface displays acquired power consumption information of a household appliance with priority to be set.

In one embodiment, the determination module is further configured to acquire the power consumption information of the household appliance with the priority to be set by the following steps:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

Another embodiment of the present disclosure provides a terminal. The terminal includes a processor, a communication interface, a memory and a communication bus, and the processor, the communication interface and the memory communicate with one another through the communication bus; and a computer program is stored in the memory, and when the computer program is executed by the processor, the processor is controlled to execute steps of the method mentioned above.

Another embodiment of the present disclosure provides a computer readable storage medium, storing a computer program executable by a terminal, and when the computer program runs on the terminal, the terminal is controlled to execute steps of the method mentioned above.

BRIEF DESCRIPTION OF THE DRAWINGS

To describe the technical solutions in the embodiments of the present disclosure or in the related art more clearly, the following describes the accompanying drawings required in descriptions of the embodiments or in the related art briefly. Apparently, the accompanying drawings in the following descriptions show some embodiments of the present disclosure, and a person of ordinary skill in the art can still derive other accompanying drawings from these accompanying drawings without creative efforts.

DETAILED DESCRIPTION

The following clearly and completely describes the technical solutions of the embodiments of the present disclosure in conjunction with the accompanying drawings of the embodiments of the present disclosure. Apparently, the embodiments described are some rather than all of the embodiments of the present disclosure. All other embodiments obtained by a person of ordinary skill in the art based on the described embodiments of the present disclosure shall fall within the protection scope of the present disclosure.

Embodiment One

Figure 1:
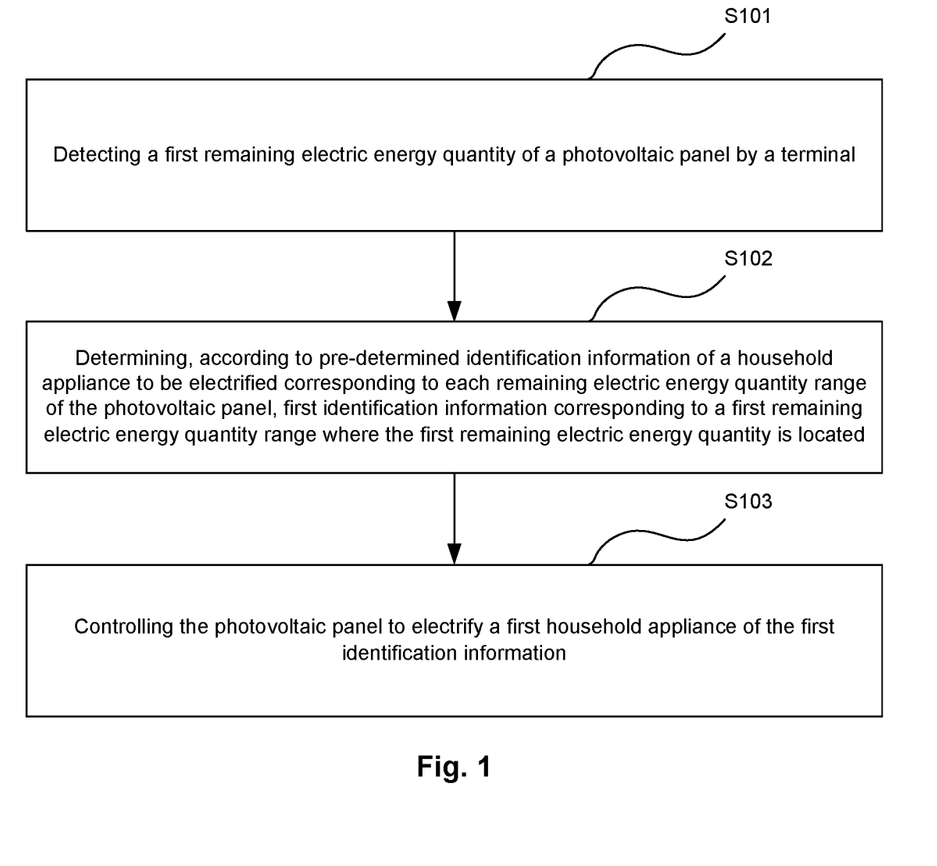
FIG. 1 is a schematic diagram of a process of distributing an electric energy quantity according to an embodiment of the present disclosure.

FIG. 1 is a schematic diagram of a process of distributing an electric energy quantity according to embodiment one of the present disclosure. The process includes the following steps.

At step S101, a terminal detects a first remaining electric energy quantity of a photovoltaic panel.

A method for distributing an electric energy quantity according to the embodiment of the present disclosure is applied to the terminal, the terminal may detect the remaining electric energy quantity of the photovoltaic panel, and the currently detected remaining electric energy quantity of the photovoltaic panel is called the first remaining electric energy quantity. Specifically, the terminal may detect the remaining electric energy quantity of the photovoltaic panel when receiving an instruction to detect the remaining electric energy quantity of the photovoltaic panel, or the terminal stores time periods of detection of the remaining electric energy quantity of the photovoltaic panel, such that the terminal detects the remaining electric energy quantity of the photovoltaic panel in each time period.

The terminal downloads an intelligent APP (a photovoltaic panel APP for short) corresponding to the photovoltaic panel in advance, which may be opened by a user. A first virtual button for detecting the remaining electric energy quantity is displayed in the photovoltaic panel APP. When the user performs an operation on the first virtual button, the terminal considers receiving instruction information of detection of the remaining electric energy quantity of the photovoltaic panel. Alternatively, a second virtual button for setting a time period of detection of the remaining electric energy quantity of the photovoltaic panel is displayed in the photovoltaic panel APP. When the user performs an operation on the second virtual button, the terminal may display a time period setting interface, for example, an input box displaying a time period. The user may input the time period in the input box, for example, one day, one week, one hour, etc. The terminal stores the time period input by the user as the time period of detection of the remaining electric energy quantity of the photovoltaic panel.

When detecting the remaining electric energy quantity of the photovoltaic panel, the terminal may send a request for obtaining the remaining electric energy quantity to the photovoltaic panel. A communication module is installed in the photovoltaic panel, after receiving the request for obtaining the remaining electric energy quantity, the communication module detects the remaining electric energy quantity and sends the remaining electric energy quantity to a terminal device. And the terminal device detects the remaining electric energy quantity of the photovoltaic panel.

The terminal directly performs communication control over the photovoltaic panel through the APP.

At step S102: first identification information corresponding to a first remaining electric energy quantity range where the first remaining electric energy quantity is located is determined according to pre-determined identification information of a household appliance to be electrified corresponding to each remaining electric energy quantity range of the photovoltaic panel.

Different remaining electric energy quantity ranges of the photovoltaic panel are stored in the terminal, and identification information of corresponding household appliances to be electrified is stored according to the different remaining electric energy quantity ranges. The different remaining electric energy quantity ranges of the photovoltaic panel stored in the terminal may be set by the user, and the user may further set corresponding household appliances to be electrified according to the different remaining electric energy quantity ranges, or set by the user.

After detecting the first remaining electric energy quantity of the photovoltaic panel, the terminal may determine, according to each pre-stored remaining electric energy quantity range of the photovoltaic panel, the remaining electric energy quantity range where the first remaining electric energy quantity is located, which is called the first remaining electric energy quantity range, determine the identification information corresponding to the first remaining electric energy quantity range, and call pre-stored identification information corresponding to the first remaining electric energy quantity range the first identification information. A household appliance of the first identification information is a household appliance which may be electrified by the photovoltaic panel of the first remaining electric energy quantity. There may be one household appliance of the first identification information, or there may be multiple household appliances of the first identification information.

At step S103, the photovoltaic panel is controlled to electrify the first household appliance of the first identification information.

After identifying the first identification information corresponding to the first remaining electric energy quantity, the terminal may control the photovoltaic panel to electrify the household appliance of the first identification information, and the household appliance of the first identification information is called the first household appliance.

The terminal may send an electrification request carrying the first identification information to the photovoltaic panel, and after receiving the electrification request carrying the first identification information, the photovoltaic panel may electrify the household appliance of the first identification information. The process of electrifying the household appliance corresponding to the identification information by the photovoltaic panel after the photovoltaic panel learns the identification information of the household appliances belongs to the related art.

A switch unit may be arranged on an electrification line between the photovoltaic panel and each household appliance, a corresponding relationship between identification information of each household appliance and the switch unit is stored in the terminal. And the switch unit is located on the electrification line between the photovoltaic panel and each household appliance of the identification information. When controlling the photovoltaic panel to electrify the first household appliance of the first identification information, the terminal may control a switch unit corresponding to the first identification information to be closed and other switch units not corresponding to the first identification information to be opened, thus controlling the photovoltaic panel to electrify the first household appliance of the first identification information.

A total electric energy quantity stored by the photovoltaic panel may have a unit of watts or kilowatts. The remaining electric energy quantity may have a unit of, for example, 0-1 kilowatts, 1-2 kilowatts, 2-3 kilowatts, etc. or may also be a percentage of the total electric energy quantity storable by photovoltaic panel, for example, 0%-20% of the total electric energy quantity, 20%-40% of the total electric energy quantity, 40%-60% of the total electric energy quantity, 60%-80% of the total electric energy quantity and 80%-100% of the total electric energy quantity.

Since in this embodiment of the present disclosure, the terminal stores different household appliances corresponding to the different remaining electric energy quantity ranges, the first household appliance to be electrified corresponding to the remaining electric energy quantity range where the first remaining electric energy quantity is located is electrified according to the detected first remaining electric energy quantity of the photovoltaic panel, thus reasonably electrifying the household appliance according to the remaining electric energy quantity of the photovoltaic panel, and improving a utilization rate of a limited electric energy quantity of the photovoltaic panel.

Embodiment Two

In order to further meet needs of a user and make a photovoltaic panel reasonably electrify multiple household appliances according to a remaining electric energy quantity, on the basis of the above embodiment, in this embodiment of the present disclosure, a process of pre-determining identification information of a household appliance to be electrified corresponding to each remaining electric energy quantity range of the photovoltaic panel includes:

for each remaining electric energy quantity range, according to pre-stored target priority corresponding to the remaining electric energy quantity range and pre-stored priority corresponding to each household appliance of different identification information, a target household appliance with the target priority is searched for, and identification information of the searched target household appliance is determined as identification information of a household appliance to be electrified corresponding to the remaining electric energy quantity range of the photovoltaic panel.

The terminal may pre-store the identification information of the household appliance corresponding to each remaining electric energy quantity range, and when the identification information of the household appliance to be electrified corresponding to each remaining electric energy quantity range of the photovoltaic panel is determined, the pre-stored identification information is taken as the determined identification information.

The terminal may further store priority corresponding to each remaining electric energy quantity range and priority for each household appliance. When the identification information of the household appliance to be electrified corresponding to each remaining electric energy quantity range of the photovoltaic panel is determined, the identification information may be determined according to the pre-stored priority corresponding to each remaining electric energy quantity range and the priority for each household appliance. Specifically, for each remaining electric energy quantity range and according to pre-stored target priority corresponding to the remaining electric energy quantity range and pre-stored priority corresponding to the household appliance of each piece of identification information, a household appliance with the target priority is searched for, the household appliance with the target priority is called a target household appliance, and identification information of the target household appliance is determined as identification information of a household appliance to be electrified corresponding to the remaining electric energy quantity range of the photovoltaic panel.

When the priority corresponding to each household appliance of different identification information is stored, a relationship between the priority and the identification information is particularly stored. When the electric appliance with the target priority is searched for, identification information corresponding to the target priority is searched for among currently stored priority corresponding to different identification information, and the electric appliance corresponding to the target priority is determined as the household appliance with the target priority.

Embodiment Three

In order to further meet needs of a user and make a photovoltaic panel reasonably electrify multiple household appliances according to a remaining electric energy quantity, on the basis of the above embodiments, in this embodiment of the present disclosure, a process of pre-storing priority corresponding to identification information of the household appliance includes:

when an instruction for setting the priority for each household appliance is received, starting AR to acquire, through scanning, a first appearance image of the household appliance;

identifying a first target appearance image matching the first appearance image in pre-stored appearance images of all the household appliances;

determining, according to first identification information corresponding to the first target appearance image, whether priority corresponding to the first target appearance image of the first identification information is stored; and when the priority corresponding to the first target appearance image of the first identification information is not stored, displaying a priority setting interface, receiving, in the priority setting interface, priority set by the user for the first target appearance image of the first identification information and storing the priority.

In this embodiment of the present disclosure, the user may set the priority for each household appliance on the terminal. Specifically, the user can open a photovoltaic panel APP, in which a third virtual button for setting the priority for each household appliance is displayed. When the user performs an operation on the third virtual button, the terminal considers receiving the instruction for setting the priority for each household appliance.

After receiving the instruction for setting the priority for each household appliance, the terminal may start a scanning function of AR. The user holds the terminal to scan an appearance of the household appliance, a terminal device acquires, through scanning, an appearance image of the household appliance, and the appearance image acquired through scanning of the household appliance is called the first appearance image.

In the terminal, a corresponding appearance image is stored in advance for each household electrical appliance. After the first appearance image is acquired, an appearance image matching the first appearance image may be identified from the pre-stored appearance images of all the household appliances, and the appearance image matching the first appearance image is called the first target appearance image. Whether two appearance images match may be determined by determining whether similarity of the two appearance images reaches a set threshold, and a process of determining whether two appearance images match belongs to the related art.

In the terminal, identification information corresponding to the appearance image of each household appliance is stored, and identification information corresponding to the first appearance image is called the first identification information. Identification information corresponding to each appearance image may be pre-stored by the terminal. When at least two household appliances have the same appearance in a region or a family, different identification information of the at least two household appliances corresponding to the appearance image may be pre-stored by the terminal.

After determining the first target appearance image, the terminal may determine whether priority corresponding to the first appearance image of the first identification information is stored according to the first identification information corresponding to the first appearance image. When the priority corresponding to the first target appearance image of the first identification information is stored, the priority corresponding to the first target appearance image of the first identification information may be displayed. When the priority corresponding to the first appearance image of the first identification information is not stored, the priority setting interface may be displayed, and the terminal may receive, in the priority setting interface, priority set by the user for the first target appearance image of the first identification information and store the priority.

The first appearance image, the first identification information and at least two kinds of settable priority may be displayed in the priority setting interface. The user selects one kind of the at least two kinds of priority displayed, the terminal takes the priority selected by the user as the priority set by the user for the first target appearance image of the first identification information, and stores a corresponding relationship among the first appearance image, the first identification information and the set priority.

The first appearance image, the first identification information, and a priority input box may be displayed in the priority setting interface, the user inputs the priority in the input box, such as priority 1, priority 2, etc., or priority a, priority b, etc., the terminal takes the priority input by the user as the priority set by the user for the first target appearance image of the first identification information, and stores a corresponding relationship among the first appearance image, the first identification information and the set priority.

When the priority corresponding to the first target appearance image with at least two pieces of first identification information is not set, the terminal may display, in the display interface, a corresponding first appearance image and at least two kinds of settable priority for each piece of displayed first identification information, and may further display, in the display interface, a corresponding first appearance image and a priority input box for each piece of displayed first identification information, such that the user may set corresponding priority for the first appearance image corresponding to different pieces of first identification information.

When the priority corresponding to the first target appearance image with at least two pieces of first identification information is not set, the terminal may further display a priority setting surface for one piece of the first identification information firstly, and then display a priority setting interface for another piece of first identification information after identifying that the user completes setting of priority corresponding to the first appearance image of the previous piece of first identification information, until corresponding priority for the first appearance image corresponding to all first identification information have is set.

A process of pre-storing a corresponding relationship between the identification information of each household appliance and the appearance image includes:

when an appearance image information input instruction is received, using a scanning function of AR to display a second appearance image acquired through scanning of each household electrical appliance;

displaying an input interface of the identification information of each household appliance, receiving third identification information of the household appliance input by the user, and correspondingly storing the third identification information and the second appearance image; and setting, through an AR scanning technology, the priority for each household appliance, so as to intelligently control priority to electrifying each household appliance by the photovoltaic panel, and improve visualization and visual interaction experience of intelligent control over each household appliance by the user.

Embodiment Four

In order to further meet needs of a user and make a photovoltaic panel reasonably electrify multiple household appliances according to a remaining electric energy quantity, on the basis of the above embodiments, in this embodiment of the present disclosure, a process of pre-storing priority corresponding to identification information of the household appliance includes:

when an instruction for setting priority for each household appliance is received, displaying an input interface of the identification information of each household appliance and receiving second identification information of each household appliance input by a user;

determining whether priority corresponding to the second identification information is stored; and when the priority corresponding to the second identification information is not stored, displaying a priority setting interface, receiving, in the priority setting interface, priority set by the user for each household appliance of the second identification information, and storing the priority.

An input box displaying the identification information may be displayed in the input interface of the identification information of each household appliance, and the user may input identification information of each household appliance in the input box of the identification information. The identification information of each household appliance input by the user is called the second identification information. After identifying receiving of the second identification information of each household appliance input by the user, the terminal may determine whether the priority corresponding to the second identification information is stored. When the priority is stored, the priority corresponding to the second identification information may be displayed. When the priority corresponding to the second identification information is not stored, the priority setting interface may be displayed, and in the priority setting interface, priority set by the user for the household appliance of the second identification information is received and stored.

The second identification information and at least two kinds of settable priority may be displayed in the priority setting interface. The user selects one kind of the at least two kinds of priority displayed, and the terminal takes the priority selected by the user as the priority set by the user for the second identification information, and stores a corresponding relationship between the first appearance image and the set priority.

The second identification information and a priority input box may be further displayed in the priority setting interface, the user inputs priority in the input box, and the terminal takes the priority input by the user as the priority set by the user for the second identification information, and stores a corresponding relationship between the second identification information and the set priority.

Embodiment Five

In order to make priority for a household appliance set by a user more reasonable, on the basis of the above embodiments, in this embodiment of the present disclosure, acquired power consumption information of a household appliance with priority to be set is displayed in a priority setting interface. The household appliance with the priority to be set may be a household appliance of second identification information described in the above embodiment, or a household appliance of first identification information.

A process of acquiring, by a terminal, the power consumption information of the household appliance with the priority to be set includes:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

After receiving the power consumption information sent by the server, the terminal may store the power consumption information for the identification information.

Figure 2:
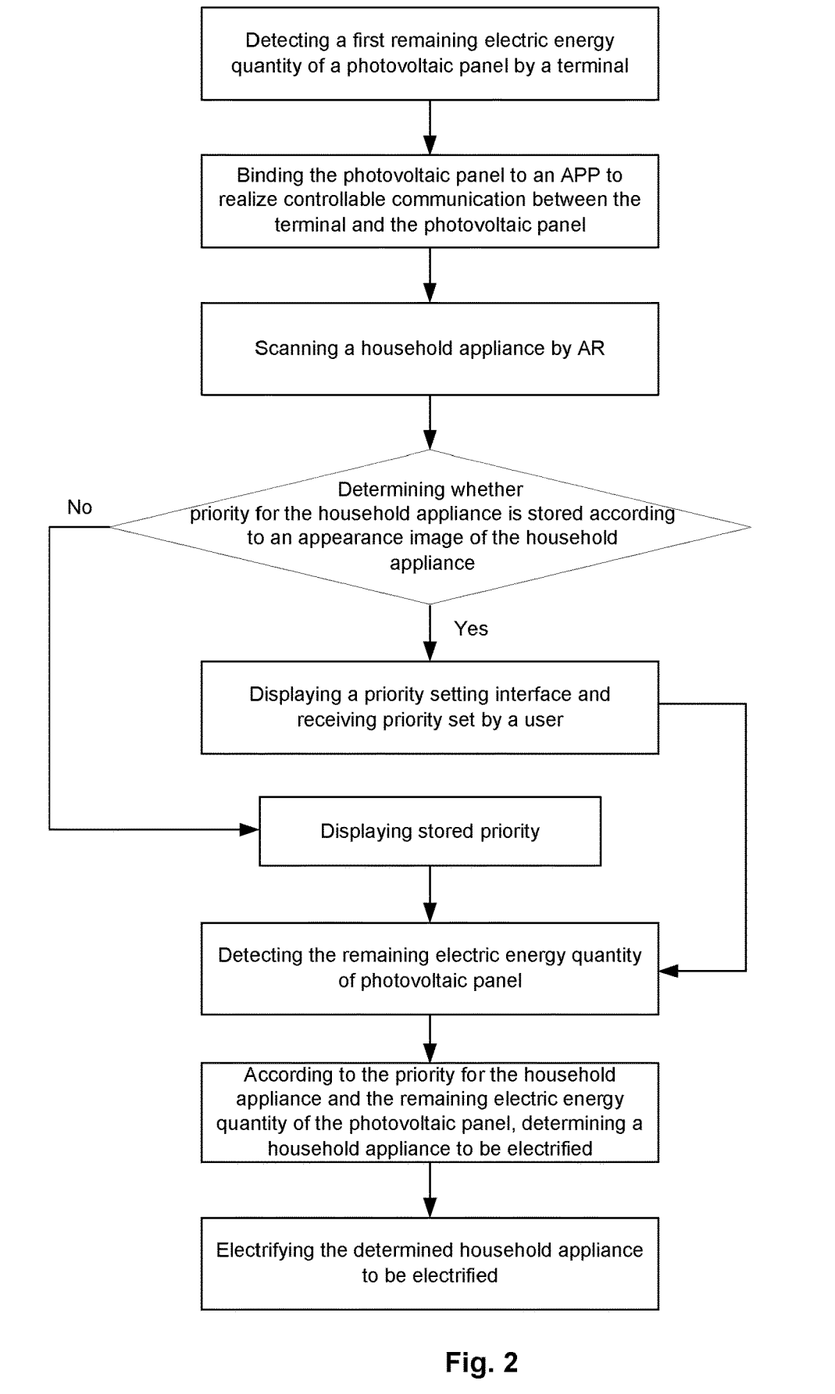
FIG. 2 is a schematic diagram of a process of distributing an electric energy quantity according to another embodiment of the present disclosure.

FIG. 2 is a schematic diagram of a process of distributing an electric energy quantity according to another embodiment of the present disclosure. The terminal downloads a photovoltaic panel APP, and a photovoltaic panel is bound to the APP to realize controllable communication between the terminal and the photovoltaic panel. The terminal scans the household appliance by using AR, and determines whether the priority for the household appliance is stored according to an appearance image of the household appliance. When the priority is not stored, the priority setting interface is displayed and priority set by the user is received. When the priority is stored, the stored priority is displayed. The terminal detects a remaining electrical energy quantity of the photovoltaic panel, determines a household appliance to be electrified according to the priority for the household appliance and the remaining electrical energy quantity of the photovoltaic panel, and then the determined household appliance to be electrified is electrified.

Through the AR scanning technology, control over the household appliance may be visualized, 3D imaging simulates visual and interactive experience of direct control over the household appliance on the terminal, and increases flexibility and interactivity of control over the household appliance. At the same time, the household appliance is scanned by AR to realize rapid identification of household appliance information. Since a reserved electric energy quantity of the photovoltaic panel is limited, and changes of external environment weather also directly affect the reserved electric energy quantity of the photovoltaic panel. In order to reasonably electrify a household appliance that needs to be more urgently electrified, it is particularly important to perform electrification according to the priority for household appliance in the case of the limited reserved electric energy quantity of the photovoltaic panel. For example, when the weather is hot, priority for an air conditioner may be set higher while priority for a TV and a computer is set lower accordingly. When there is no great remaining electrical energy quantity of the photovoltaic panel, priority is given to electrification of the air conditioner. When the remaining electrical energy quantity of the photovoltaic panel is great, the TV and the computer may be electrified then, thus realizing rationalization and maximum use of the remaining electrical energy quantity of the photovoltaic panel, reducing use of commercial power, and creating a fortune for ourselves while energy is saved and the environment is protected.

Embodiment Six

Figure 3:
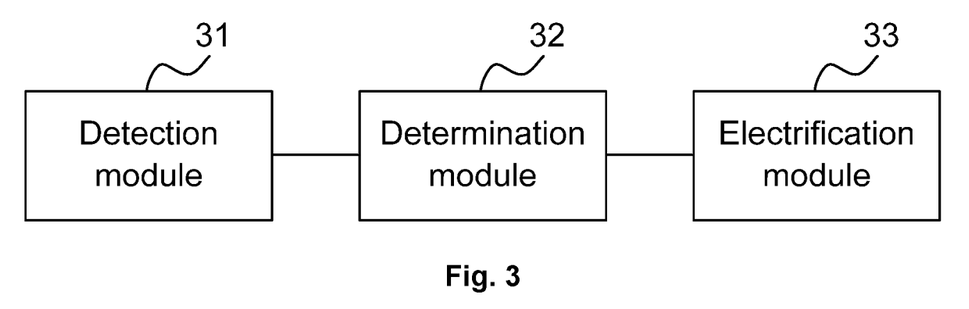
FIG. 3 is a structural block diagram of an apparatus for distributing an electric energy quantity according to an embodiment of the present disclosure.

FIG. 3 is a structural block diagram of an apparatus for distributing an electric energy quantity according to an embodiment of the present disclosure. The apparatus includes:

a detection module 31, configured to detect a first remaining electric energy quantity of a photovoltaic panel;

a determination module 32, configured to determine, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and an electrification module 33, configured to control the photovoltaic panel to electrify a first household appliance of the first identification information.

In one embodiment, the determination module 32 is configured to, for each remaining electric energy quantity range and according to pre-stored target priority corresponding to the remaining electric energy quantity range and pre-stored priority corresponding to each household appliance of different identification information, search for a target household appliance with target priority, and determine identification information of the searched target household appliance as identification information of a household appliance to be electrified corresponding to the remaining electric energy quantity range of the photovoltaic panel.

In one embodiment, the determination module 32 is configured to, when an instruction for setting the priority for each household appliance is received, start AR to acquire, through scanning, a first appearance image of the household appliance;

identify a first target appearance image matching the first appearance image in pre-stored appearance images of all the household appliances;

determine, according to first identification information corresponding to the first target appearance image, whether priority corresponding to the first target appearance image of the first identification information is stored; and when the priority corresponding to the first target appearance image of the first identification information is not stored, display a priority setting interface, receive, in the priority setting interface, priority set by the user for the first target appearance image of the first identification information and store the priority.

In one embodiment, the determination module 32 is configured to, when the instruction for setting priority for each household appliance is received, display an input interface of the identification information of each household appliance and receive second identification information of each household appliance input by a user;

determine whether priority corresponding to the second identification information is stored; and when the priority corresponding to the second identification information is not stored, display a priority setting interface, receive, in the priority setting interface, priority set by the user for each household appliance of the second identification information, and store the priority.

In one embodiment, the priority setting interface displays acquired power consumption information of a household appliance with priority to be set.

In one embodiment, the determination module 32 is further configured to acquire the power consumption information of the household appliance with the priority to be set by the following steps:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

Embodiment Seven

Figure 4:
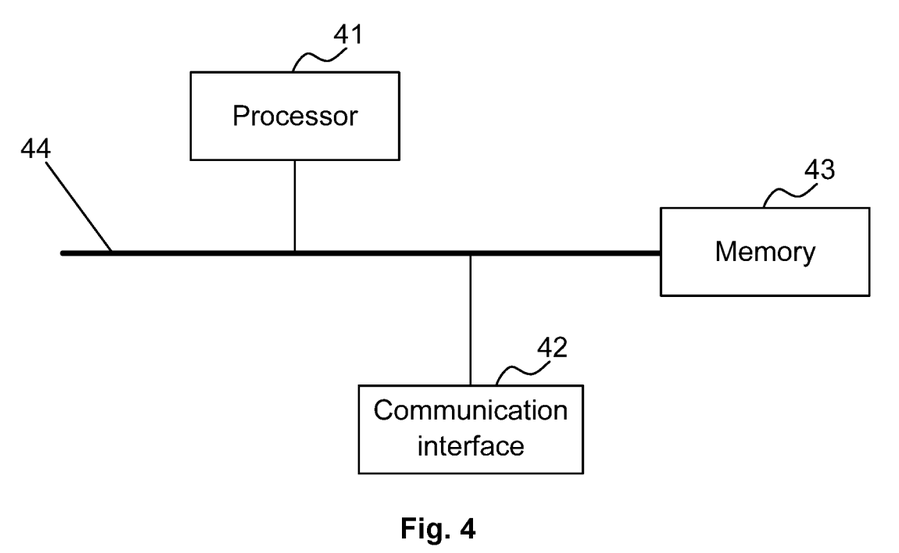
FIG. 4 is a structural schematic diagram of a terminal according to an embodiment of the present disclosure.

FIG. 4 is a structural schematic diagram of a terminal according to an embodiment of the present disclosure. The terminal includes a processor 41, a communication interface 42, a memory 43 and a communication bus 44, and the processor, the communication interface and the memory communicate with one another through the communication bus; and a computer program is stored in the memory, and when the computer program is executed by the processor, the processor is controlled to execute the following steps:

detecting a first remaining electric energy quantity of a photovoltaic panel;

determining, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and controlling the photovoltaic panel to electrify a first household appliance of the first identification information.

In one embodiment, a process of pre-determining the identification information of the at least one household appliance to be electrified corresponding to each remaining electric energy quantity range of the photovoltaic panel includes: for each remaining electric energy quantity range, according to pre-stored target priority corresponding to the remaining electric energy quantity range and pre-stored priority corresponding to each household appliance of different identification information, searching for a target household appliance with the target priority, and determining identification information of the searched target household appliance as identification information of a household appliance to be electrified corresponding to the remaining electric energy quantity range of the photovoltaic panel.

In one embodiment, a process of pre-storing the priority corresponding to the identification information of the household appliance includes:

when an instruction for setting priority for each household appliance is received, starting AR to acquire, through scanning, a first appearance image of the household appliance;

identifying a first target appearance image matching the first appearance image in pre-stored appearance images of all the household appliances;

determining, according to first identification information corresponding to the first target appearance image, whether priority corresponding to the first target appearance image of the first identification information is stored; and when the priority corresponding to the first target appearance image of the first identification information is not stored, displaying a priority setting interface, receiving, in the priority setting interface, priority set by a user for the first target appearance image of the first identification information, and storing the priority.

In one embodiment, a process of pre-storing the priority corresponding to identification information of each household appliance includes:

when the instruction for setting the priority for each household appliance is received, displaying an input interface of the identification information of each household appliance and receiving second identification information of each household appliance input by a user;

determining whether priority corresponding to the second identification information is stored; and when the priority corresponding to the second identification information is not stored, displaying a priority setting interface, receiving, in the priority setting interface, priority set by a user for each household appliance of the second identification information, and storing the priority.

In one embodiment, the priority setting interface displays acquired power consumption information of a household appliance with priority to be set.

In one embodiment, a process of acquiring the power consumption information of the household appliance with the priority to be set includes:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

The communication bus mentioned in the terminal in the above embodiments may be a Peripheral Component Interconnect (PCI) bus, an Extended Industry Standard Architecture (EISA) bus, etc. The communication bus may be classified into an address bus, a data bus, a control bus, etc. For convenience of denotation, one bold line is used in the diagram for denotation, which does not mean that there is one bus or one type of bus.

The communication interface is used for communication between the terminal and other devices.

The memory may include a random access memory (RAM) or a non-volatile memory (NVM), such as at least one disk memory. Optionally, the memory may also be at least one storing device located far away from the aforementioned processor.

The above processor may be a general-purpose processor, including a central processing unit, a network processor (NP), etc, and may also be a digital signal processing (DSP), an application-specific integrated circuit, a field programmable gate array or another programmable logic device, a discrete gate, a transistor logic device, a discrete hardware components, etc.

Embodiment Seven

An embodiment of the present disclosure discloses a computer readable storage medium, which stores a computer program executable by a terminal, and when the computer program runs on the terminal, the terminal is controlled to execute the following steps:

detecting a first remaining electric energy quantity of a photovoltaic panel;

determining, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and controlling the photovoltaic panel to electrify a first household appliance of the first identification information.

In one embodiment, a process of pre-determining the identification information of the at least one household appliance to be electrified corresponding to each remaining electric energy quantity range of the photovoltaic panel includes:

for each remaining electric energy quantity range, according to pre-stored target priority corresponding to the remaining electric energy quantity range and pre-stored priority corresponding to each household appliance of different identification information, searching for a target household appliance with the target priority, and determining identification information of the searched target household appliance as identification information of a household appliance to be electrified corresponding to the remaining electric energy quantity range of the photovoltaic panel.

In one embodiment, a process of pre-storing the priority corresponding to the identification information of the household appliance includes:

when an instruction for setting priority for each household appliance is received, starting AR to acquire, through scanning, a first appearance image of the household appliance;

identifying a first target appearance image matching the first appearance image in pre-stored appearance images of all the household appliances;

determining, according to first identification information corresponding to the first target appearance image, whether priority corresponding to the first target appearance image of the first identification information is stored; and when the priority corresponding to the first target appearance image of the first identification information is not stored, displaying a priority setting interface, receiving, in the priority setting interface, priority set by a user for the first target appearance image of the first identification information, and storing the priority.

In one embodiment, a process of pre-storing the priority corresponding to identification information of each household appliance includes:

when the instruction for setting the priority for each household appliance is received, displaying an input interface of the identification information of each household appliance and receiving second identification information of each household appliance input by a user;

determining whether priority corresponding to the second identification information is stored; and when the priority corresponding to the second identification information is not stored, displaying a priority setting interface, receiving, in the priority setting interface, priority set by a user for each household appliance of the second identification information, and storing the priority.

In one embodiment, the priority setting interface displays acquired power consumption information of a household appliance with priority to be set.

In one embodiment, a process of acquiring the power consumption information of the household appliance with the priority to be set includes:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

The computer-readable storage medium in the above embodiments may be any available medium or data storage device that may be accessed by the processor in the terminal, including, but not limited to, magnetic memories such as floppy disks, hard disks, magnetic tapes and magneto-optical disks (MO), and optical memories such as Compact Disc (CD), Digital Video Disc (DVD), Blu-ray Disc (BD) and High-definition Versatile Disc (HVD), and semiconductor memories such as Read only Memory (ROM), Electrically Programmable Read only Memory (EPROM), Electrically Erasable Programmable Read only Memory (EEPROM), NAND flash memories, and solid state disks (SSD).

Embodiment Eight

An embodiment of the present disclosure discloses a system for distributing an electric energy quantity. The system includes the above apparatus for distributing the electric energy quantity applied to a terminal, a photovoltaic panel, and a household appliance to be electrified by the photovoltaic panel.

Since an embodiment of the system/apparatus is basically similar to an embodiment of a method, its description is relatively simple, and relevant contents may be seen from partial description of the embodiment of the method.

It should be noted that in this description, relational terms such as first and second are only used to distinguish one entity or one operation from another entity or another operation, and do not necessarily require or imply any such actual relationship or order among these entities or operations.

Those skilled in the art should understand that the embodiments of the present disclosure may be provided as methods, systems, or computer program products. Therefore, the present disclosure may take the form of an entire hardware embodiment, an entire application embodiment, or an embodiment combining applications and hardware. Moreover, the present disclosure may take the form of a computer program product implemented on at least one computer usable storage media (including, but not limited to, disk memories, CD-ROMs, optical memories, etc.) containing computer usable program codes.

The present disclosure is described with reference to flowcharts and/or block diagrams of methods, devices (systems), and computer program products according to the embodiments of the present disclosure. It should be understood that each flow and/or block in the flowchart and/or block diagram and a combination of the flow and/or block in the flowchart and/or block diagram can be implemented by computer program instructions. These computer program instructions may be provided for a processor of a general-purpose computer, a special-purpose computer, an embedded processor, or other programmable data processing devices to produce a machine, such that instructions executed by the processor of the computer or other programmable data processing devices produce an apparatus used for implementing a function specified in at least one flow of the flowchart and/or at least one block of the block diagram.

These computer program instructions may also be stored in a computer readable memory that can guide a computer or other programmable data processing devices to work in a specific manner, such that the instructions stored in the computer readable memory produce an article of manufacture including an instruction device, and the instruction device implements the functions specified in at least one flow of the flowchart and/or at least one block in the block diagram.

These computer program instructions may also be loaded onto the computer or other programmable data processing devices, such that a series of operating steps are performed on the computer or other programmable devices to generate computer-implemented processing, and instructions executed on the computer or other programmable devices provide steps for implementing the functions specified in the at least one flow of the flowchart and/or at least one block in the block diagram.

Although the embodiments of the present disclosure have been described, those skilled in the art can make additional changes and modifications to these embodiments once they learn the basic inventive concept. Therefore, the appended claims are intended to be interpreted as including the embodiments and all changes and modifications falling within the scope of the present disclosure.

Apparently, those skilled in the art can make various modifications and variations to the present disclosure without departing from the spirit and scope of the present disclosure. In this way, when these modifications and variations of the present disclosure fall within the scope of the claims of the present disclosure and their equivalent technologies, the present disclosure is also intended to include these modifications and variations.

What is claimed is:

1. A method for distributing an electric energy quantity, comprising:
    detecting, by a terminal, a first remaining electric energy quantity of a photovoltaic panel;
    determining, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and
    controlling the photovoltaic panel to electrify a first household appliance of the first identification information;
    wherein a process of pre-determining the identification information of the at least one household appliance to be electrified corresponding to each remaining electric energy quantity range of the photovoltaic panel comprises:
    for each remaining electric energy quantity range, according to pre-stored target priority corresponding to the remaining electric energy quantity range and pre-stored priority corresponding to each household appliance of different identification information, searching for a target household appliance with the target priority, and determining identification information of the searched target household appliance as identification information of a household appliance to be electrified corresponding to the remaining electric energy quantity range of the photovoltaic panel.

2. The method as claimed in claim 1, wherein a process of pre-storing the priority corresponding to the identification information of the household appliance comprises:
    when an instruction for setting priority for each household appliance is received, starting Augmented Reality (AR) to acquire, through scanning, a first appearance image of the household appliance;
    identifying a first target appearance image matching the first appearance image in pre-stored appearance images of all the household appliances;
    determining, according to first identification information corresponding to the first target appearance image, whether priority corresponding to the first target appearance image of the first identification information is stored; and
    when the priority corresponding to the first target appearance image of the first identification information is not stored, displaying a priority setting interface, receiving, in the priority setting interface, priority set by a user for the first target appearance image of the first identification information and storing the priority.

3. The method as claimed in claim 1, wherein a process of pre-storing the priority corresponding to identification information of each household appliance comprises:
    when an instruction for setting priority for each household appliance is received, displaying an input interface of identification information of each household appliance and receiving second identification information of each household appliance input by a user;
    determining whether priority corresponding to the second identification information is stored; and
    when the priority corresponding to the second identification information is not stored, displaying a priority setting interface, receiving, in the priority setting interface, priority set by a user for each household appliance of the second identification information, and storing the priority.

4. The method as claimed in claim 2, wherein the priority setting interface displays acquired power consumption information of a household appliance with priority to be set, and the household appliance with the priority to be set is the household appliance of the first identification information.

5. The method as claimed in claim 4, wherein a process of acquiring the power consumption information of the household appliance with the priority to be set comprises:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

6. A terminal, comprising: a processor, a communication interface, a memory and a communication bus, wherein the processor, the communication interface and the memory communicate with one another through the communication bus; and a computer program is stored in the memory, and when the computer program is executed by the processor, the processor is controlled to execute steps of the method as claimed in claim 1.

7. A non-transitory storage medium, storing a computer program executable by a terminal, and when the computer program runs on the terminal, the terminal is controlled to execute steps of the method as claimed in claim 1.

8. The method as claimed in claim 1, wherein detecting, by the terminal, the first remaining electric energy quantity of the photovoltaic panel comprises:

detecting, by the terminal, the remaining electric energy quantity of the photovoltaic panel when receiving an instruction to detect the remaining electric energy quantity of the photovoltaic panel; or, storing, by the terminal, time periods of detection of the remaining electric energy quantity of the photovoltaic panel, detecting, by the terminal, the remaining electric energy quantity of the photovoltaic panel in each time period.

9. The method as claimed in claim 1, wherein a switch unit is arranged on an electrification line between the photovoltaic panel and each household appliance, and a corresponding relationship between identification information of each household appliance and the switch unit is stored in the terminal.

10. The method as claimed in claim 9, wherein when controlling the photovoltaic panel to electrify the first household appliance of the first identification information, the terminal controls a switch unit corresponding to the first identification information to be closed and other switch units not corresponding to the first identification information to be opened.

11. The method as claimed in claim 2, wherein the first appearance image, the first identification information and at least two kinds of settable priority are displayed in a priority setting interface, and when the user selects one kind of the at least two kinds of priority displayed, the terminal takes the priority selected by the user as the priority set by the user for the first target appearance image of the first identification information, and stores a corresponding relationship among the first appearance image, the first identification information and the set priority.

12. The method as claimed in claim 3, wherein the second identification information and at least two kinds of settable priority are displayed in a priority setting interface, and when the user selects one kind of the at least two kinds of priority displayed, the terminal takes the priority selected by the user as the priority set by the user for the second identification information, and stores a corresponding relationship between the first appearance image and the set priority.

13. The method as claimed in claim 3, wherein the priority setting interface displays acquired power consumption information of a household appliance with priority to be set, and the household appliance with the priority to be set is the household appliance of the second identification information.

14. An apparatus for distributing an electric energy quantity, comprising:

a detection module, configured to detect a first remaining electric energy quantity of a photovoltaic panel;

a determination module, configured to determine, according to pre-determined identification information of at least one household appliance to be electrified corresponding to each remaining electric energy quantity range of the photovoltaic panel, first identification information corresponding to a first remaining electric energy quantity range where the first remaining electric energy quantity is located; and an electrification module, configured to control the photovoltaic panel to electrify a first household appliance of the first identification information;

wherein the determination module is configured to, for each remaining electric energy quantity range, according to pre-stored target priority corresponding to the remaining electric energy quantity range and pre-stored priority corresponding to each household appliance of different identification information, search for a target household appliance with the target priority, and determine identification information of the searched target household appliance as identification information of a household appliance to be electrified corresponding to the remaining electric energy quantity range of the photovoltaic panel.

15. The apparatus as claimed in claim 14, wherein the determination module is further configured to, when an instruction for setting the priority for each household appliance is received, start AR to acquire, through scanning, a first appearance image of the household appliance; identify a first target appearance image matching the first appearance image in pre-stored appearance images of all the household appliances; determine, according to first identification information corresponding to the first target appearance image, whether priority corresponding to the first target appearance image of the first identification information is stored;

and when the priority corresponding to the first target appearance image of the first identification information is not stored, display a priority setting interface, receiving, in the priority setting interface, priority set by a user for the first target appearance image of the first identification information and storing the priority.

16. The apparatus as claimed in claim 14, wherein the determination module is further configured to, when an instruction for setting priority for each household appliance is received, display an input interface of identification information of each household appliance and receive second identification information of each household appliance input by a user; determine whether priority corresponding to the second identification information is stored; and when the priority corresponding to the second identification information is not stored, display a priority setting interface, receive, in the priority setting interface, priority set by the user for each household appliance of the second identification information, and save the priority.

17. The apparatus as claimed in claim 15, wherein the priority setting interface displays acquired power consumption information of a household appliance with priority to be set.

18. The apparatus as claimed in claim 17, wherein the determination module is further configured to acquire the power consumption information of the household appliance with the priority to be set by the following steps:

identifying, according to identification information of the household appliance with the priority to be set, whether power consumption information corresponding to the identification information is stored;

when the power consumption information corresponding to the identification information is stored, taking the stored power consumption information as the acquired power consumption information of the household appliance with the priority to be set; and when the power consumption information corresponding to the identification information is not stored, sending a request, carrying the identification information, for acquiring power consumption information to a server, and determining power consumption information sent by the server as the acquired power consumption information of the household appliance with the priority to be set.

* * * * *